Sept. 3, 1935.　　　J. M. COLBY ET AL　　　2,012,958
TRACK FOR TRACKLAYING VEHICLES
Filed June 14, 1933
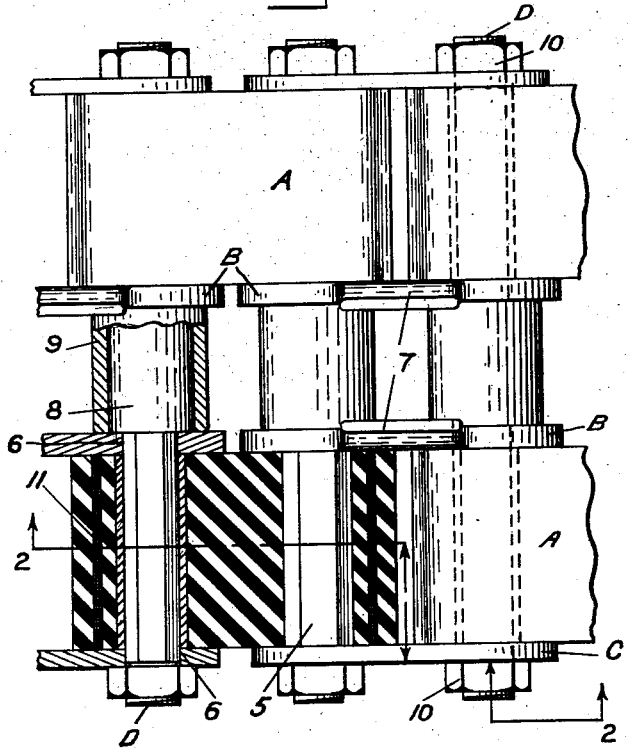
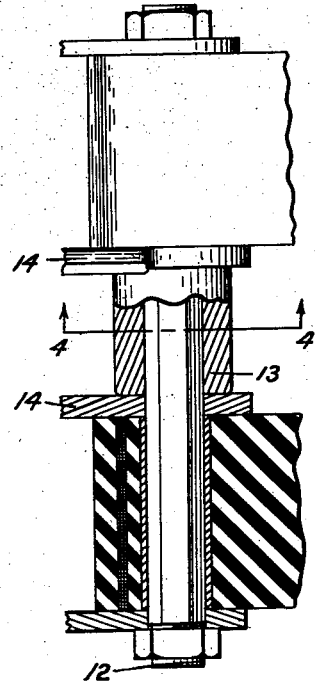
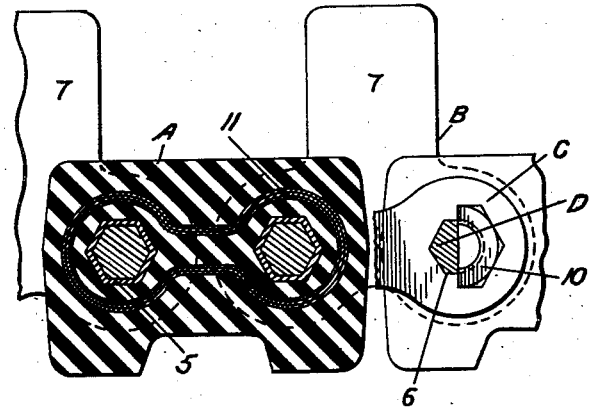
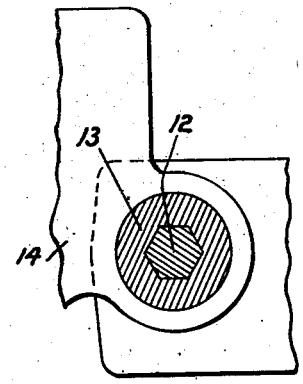
Inventors
Joseph M. Colby
Leslie A. Skinner
BY W. N. Roach
ATTORNEY Patented Sept. 3, 1935

2,012,958

UNITED STATES PATENT OFFICE 2,012,958

TRACK FOR TRACKLAYING VEHICLES

Joseph M. Colby and Leslie A. Skinner,
United States Army, Aberdeen, Md.

Application June 14, 1933, Serial No. 675,756

8 Claims. (Cl. 305—10)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a track for track-laying vehicles.

The purpose of this invention is to provide a track which is conveniently formed of sections in the manner of a jointed link track but which operates in flection in the manner of a jointless band track. The track is composed of a double row of rubber blocks or shoes whose inner sides constitute rails for the supporting wheels of the vehicle and whose outer sides are adapted to engage the ground.

A further object of the invention is to provide a novel assembly in which the link pins are held against rotational displacement relative to the shoes as well as to the connecting links in order to insure flection of the track through the intermediate portions of the rubber blocks.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is an inner plan view partly in section of a portion of the lower flight of an endless track constructed in accordance with the invention.

Fig. 2 is a view on the line 2—2 of Fig. 1.

Fig. 3 is a view similar to Fig. 1 of a modified form of track.

Fig. 4 is a sectional view on the line 4—4 of Fig. 3.

Fig. 5 is a sectional view of a modified form of bushing.

The track comprises a double row of shoes A connected in spaced relation by links B and C mounted on link pins D.

The shoes are all identical and each consists of a block of resilient material, such as rubber, capable of bending sufficiently to enable an endless track formed of the blocks to be trained about the wheels of a vehicle. The inner sides of the blocks form a rail for the wheels of the vehicle while the outer sides are adapted to provide a traction surface for engaging the ground.

A pair of bushings 5—5 extend laterally through each block adjacent its ends and are preferably bonded thereto by vulcanizing. The interior of the bushings have a non-circular configuration in cross-section, preferably being hexagonal as shown in Fig. 2 and receiving a correspondingly shaped portion of the link pin D whereby there can be no relative rotational displacement between the link pin and bushing. In Fig. 2 the exterior of the bushing has the same shape as the interior but it is to be clearly understood that the exterior may be circular as shown in the bushing 5a of Fig. 5. In the latter case the bonding alone holds the block in place on the bushing.

The adjacent link pins of adjacent pairs of shoes are connected by the links B and C, the links B being placed on the inside between the rows of shoes and the links C being placed on the outside of the rows of shoes. The links are provided adjacent their ends with apertures 6—6, corresponding in shape to the non-circular portions of the link pins D, so that there will be no relative rotational displacement between these members. In order to provide an absolutely rigid assembly the links B may be welded to the link pins. The links B—B include wheel guides 7 and are held in spaced relation by circular collars 8 on the central parts of the link pins D. Each collar mounts a roller 9 constituting a driving lug to be engaged by the sprocket wheel (not shown). The links C are held in place by nuts 10 threaded on the link pins D.

Each rubber block is provided with a reinforcement 11 of fabric or metal, extending around the bushings 5 and serving to eliminate or reduce stretching of the block.

In the modification shown in Figs. 3 and 4 the link pin 12 is of non-circular cross-section at its center part, and a separate collar 13 non-rotatably mounted thereon, constitutes a driving lug and serves to space the links 14.

In action, flection of the track occurs in the intermediate portions of the shoes between the link pins, since the bushings 5 and links B and C cannot turn on the link pins D.

We claim:

1. In a track for track-laying vehicles, a double row of shoes, each shoe consisting of a block of flexible material, a pair of bushings extending laterally through opposite ends of each block and bonded thereto, said bushings having non-circular inner and outer peripheries, link pins of corresponding outer periphery passing through the aligned bushings of laterally adjacent shoes and each having a central circular portion, pairs of links disposed between the rows of shoes and connecting adjacent link pins of longitudinally adjacent shoes, said links spaced by the central circular portions of the link pins and having non-rotative engagement with the link pins, links connecting the outer ends of associated link pins and having non-rotative engagement therewith, and a roller on the circular portion of each link pin.

2. In a track for track-laying vehicles, a double row of shoes, each shoe consisting of a block of flexible material, a pair of bushings extending laterally through opposite ends of each block and bonded thereto, said bushings having non-circular inner and outer peripheries, link pins of corresponding outer periphery passing through the aligned bushings of laterally adjacent shoes and each having a central circular portion, pairs of links disposed between the rows of shoes and connecting adjacent link pins of longitudinally adjacent shoes, said links spaced by the central circular portions of the link pins and having non-rotative engagement with the link pins, links connecting the outer ends of associated link pins and having non-rotative engagement therewith.

3. In a track for track-laying vehicles, a double row of shoes, each shoe consisting of a block of flexible material, a pair of bushings extending laterally through opposite ends of each block and bonded thereto, said bushings having non-circular inner peripheries, link pins of corresponding outer periphery passing through the aligned bushings of laterally adjacent shoes, pairs of links disposed between the rows of shoes and connecting adjacent link pins of longitudinally adjacent shoes, said links having non-rotative engagement with the link pins, links connecting the outer ends of associated link pins and a driving member centrally on each link pin and spacing the links between the rows of shoes.

4. In a track for track-laying vehicles, a double row of shoes, each shoe consisting of a block of flexible material, a pair of bushings extending laterally through and fixed in opposite ends of each block, link pins passing through aligned bushings of laterally adjacent shoes and having non-rotative engagement therewith and links connecting adjacent link pins of longitudinally adjacent shoes and some of said links having non-rotative engagement with the link pins.

5. In a track for track-laying vehicles, a double row of shoes, each shoe consisting of a block of flexible material, a pair of bushings extending laterally through and fixed in opposite ends of each block, link pins passing through aligned bushings of laterally adjacent shoes and having non-rotative engagement therewith and links connecting adjacent link pins of longitudinally adjacent shoes and having non-rotative engagement with the link pins.

6. In a track for track-laying vehicles, a double row of shoes, each shoe consisting of a block of flexible material, a pair of bushings extending laterally through and fixed in opposite ends of each block, link pins passing through aligned bushings of laterally adjacent shoes and having non-rotative engagement therewith and links connecting adjacent link pins of longitudinally adjacent shoes.

7. In a track for track-laying vehicles, a double row of shoes, each shoe consisting of a block of flexible material, a pair of bushings extending laterally through and fixed in opposite ends of each block, link pins passing through aligned bushings of laterally adjacent shoes, and links connecting adjacent link pins of longitudinally adjacent shoes and some of said links having non-rotative engagement with the link pins.

8. In a track for track-laying vehicles, a double row of shoes, each shoe consisting of a block of flexible material, a pair of bushings extending laterally through and fixed in opposite ends of each block, link pins passing through aligned bushings of laterally adjacent shoes, and links connecting adjacent link pins of longitudinally adjacent shoes and having non-rotative engagement with the link pins.

LESLIE A. SKINNER.
JOSEPH M. COLBY.